(12) United States Patent
Yang

(10) Patent No.: US 7,823,259 B2
(45) Date of Patent: Nov. 2, 2010

(54) FAST LOOPING-UP AND RELEASING ROPE LOOP ASSEMBLY

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 12/371,918

(22) Filed: Feb. 17, 2009

(65) Prior Publication Data
US 2010/0205784 A1    Aug. 19, 2010

(51) Int. Cl.
*F16G 11/10* (2006.01)

(52) U.S. Cl. .................. 24/298; 24/302; 24/132 R; 24/170; 24/193; 254/333; 254/365; 254/391; 114/199

(58) Field of Classification Search .............. 24/136 K, 24/136 L, 132 R, 68 R, 614, 200, 193, 197, 24/134 R, 298, 170, 191, 71.1, 302; 114/199, 114/361, 391; 254/391, 411, 223, 217
See application file for complete search history.

(56) References Cited

U.S. PATENT DOCUMENTS

| | | | | |
|---|---|---|---|---|
| 2,967,046 A * | 1/1961 | Ratcliff | ........................ | 254/369 |
| 3,020,612 A * | 2/1962 | Meeker | ........................ | 24/170 |
| 5,173,996 A * | 12/1992 | Chou | ........................ | 24/68 CD |
| 5,368,281 A * | 11/1994 | Skyba | ........................ | 254/391 |
| 5,423,644 A * | 6/1995 | First, Sr. | ........................ | 410/100 |
| 5,440,790 A * | 8/1995 | Chou | ........................ | 24/302 |
| 5,456,398 A * | 10/1995 | Allen | ........................ | 224/329 |
| 5,722,640 A * | 3/1998 | Skyba | ........................ | 254/333 |
| 5,957,432 A * | 9/1999 | Ostrobrod | ........................ | 254/368 |
| 6,092,791 A * | 7/2000 | Kingery | ........................ | 254/371 |
| 6,149,133 A * | 11/2000 | Skyba | ........................ | 254/391 |
| 6,195,848 B1 * | 3/2001 | Jackson et al. | ........................ | 24/68 CD |
| 6,637,077 B2 * | 10/2003 | Doty | ........................ | 24/302 |
| 6,648,381 B2 | 11/2003 | Holton et al. | ........................ | 292/288 |
| 7,096,827 B2 | 8/2006 | Sporn | ........................ | 119/797 |
| 7,111,572 B1 | 9/2006 | Yang | ........................ | 114/199 |
| 7,146,926 B1 | 12/2006 | Yang | ........................ | 114/361 |
| 7,287,303 B2 | 10/2007 | Yang | ........................ | 24/134 R |
| 7,537,199 B1 | 5/2009 | Anderson | ........................ | 254/411 |
| 2007/0271738 A1 | 11/2007 | Yang | ........................ | 24/163 R |
| 2008/0083096 A1 | 4/2008 | Wilkinson | ........................ | 24/298 |
| 2008/0148529 A1 | 6/2008 | Huang | ........................ | 24/170 |

* cited by examiner

*Primary Examiner*—Robert J Sandy
*Assistant Examiner*—Rowland D Do
(74) *Attorney, Agent, or Firm*—Leong C. Lei

(57) ABSTRACT

A fast looping-up and releasing rope loop assembly includes two one-way locking devices, at least one band, and a buckle. The one-way locking device includes a body constituted by a base and a cover. The one-way locking device allows the pull rope to extend therethrough and to move with respect thereto along a single direction. By inserting the pull rope through a rope entry opening of the base of the one-way locking device and further extending the rope around a rotary disk and a rotary wheel arranged inside the locking device and extending out of the locking device, the one-way locking device that locks the movement of the rope in an opposite direction is completed. When the rope is jammed due to excessive tightening, a presser of the buckle is depressed to release the one-way locking device from the jamming condition so that efficient loop-up and release can be realized.

9 Claims, 8 Drawing Sheets

FAST LOOPING-UP AND RELEASING ROPE LOOP ASSEMBLY

TECHNICAL FIELD OF THE INVENTION

The present invention generally relates to a fast looping-up and releasing rope loop assembly, which eliminates jamming problem of a rope loop that is operated with a one-way locking device to facilitate efficient release of the rope loop applicable to loop up an opening of a sack or the likes, and is particularly applicable to a covering sack for a yacht or a jet ski.

DESCRIPTION OF THE PRIOR ART

When a motorized vehicle, such as a yacht or a jet ski, is to be stowed for not use for a long while, it is often to cover to vehicle with a dust-proof cover to protect the vehicle from being contaminated by dust or other debris and also to protect the vehicle against aging and surface cracking caused by sun light.

The dust-proof cover is set over the yacht or the jet ski. When the yacht or the jet ski is transported to a marine area through road transportation, the dust-proof cover that covers the yacht or jet ski may be blown away by the high speed air flow caused during the road transportation through for example a high way. Thus, a rope is often used to loop up the cover around the yacht or jet ski for securing the cover. This is proven to be not working effectively in securing the cover and the cover may still be blown away once it is acted upon by strong blows. Another way is to use a sufficient length of rope, which can be for example as long as 80 feet, to entangle around fixation bars set around a yacht carrier platform to secure the cover on the yacht or jet ski. However, this is an elaborate and time-consuming job for entangling the rope around the yacht carrier platform, and the entangling rope is susceptible to over-tightening after being acted upon by strong blows during the road transportation, making it difficult to release subsequently.

It is thus desired to provide a rope loop assembly that can efficiently tightened and released and is applicable to cover an article without the risk of being blown away when undergoing high way transportation and without the risk of jamming of the rope so as to facilitate efficient release of the rope loop assembly.

SUMMARY OF THE INVENTION

The primary objective of the present invention is to provide a fast looping-up and releasing rope loop assembly that can be efficiently tightened and released so that a cover to which a one-way locking device and a rope of the rope loop assembly are attached can be effectively looped up without being blown off during high speed transpiration through for example a high way.

Another objective of the present invention is to provide a fast looping-up and releasing rope loop assembly, wherein in case a one-way locking device that selectively fixes the rope get jammed, a presser of a buckle can be simply depressed in a one-step operation to release the rope for a given distance that serves as a buffering space for actually releasing the rope so that convenience of efficient loop-up and release of the rope loop assembly can be realized.

To achieve the above objectives, the present invention provides a fast looping-up and releasing rope loop assembly comprising two one-way locking devices, at least one band, and a buckle. The one-way locking device has a configuration that allows a rope extending therethrough to be pulled in a single direction and prevents movement of the rope in an opposite direction. The one-way locking device is provided at one side thereof with a metal slotted plate through which the band extends. An end of the band is coupled to the buckle. The rope is set to extend along an opening of a covering sack, whereby the opening of the sack can be looped up by pulling the rope to cause the rope to be withdrawn in a single direction to loop up the sack opening. To release the sack opening, a presser of the buckle is depressed to provide an initial release of the sack opening and an operation arm of the one-way locking device is actuated to completely release the rope of the sack opening. Thus, efficient loop-up and release of the rope loop assembly can be realized.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
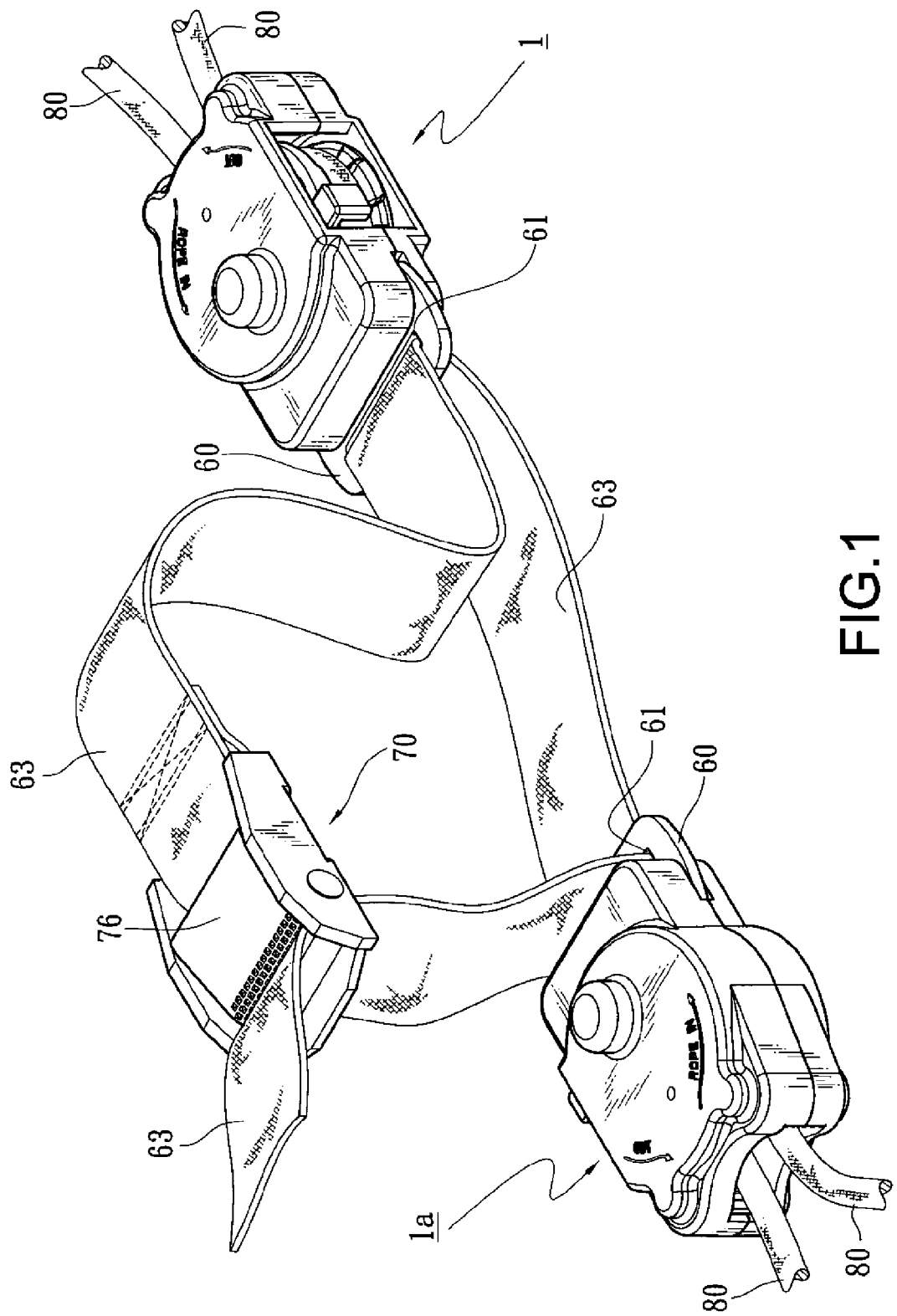
FIG. 1 is a perspective view of a first embodiment of the present invention.
Figure 2:
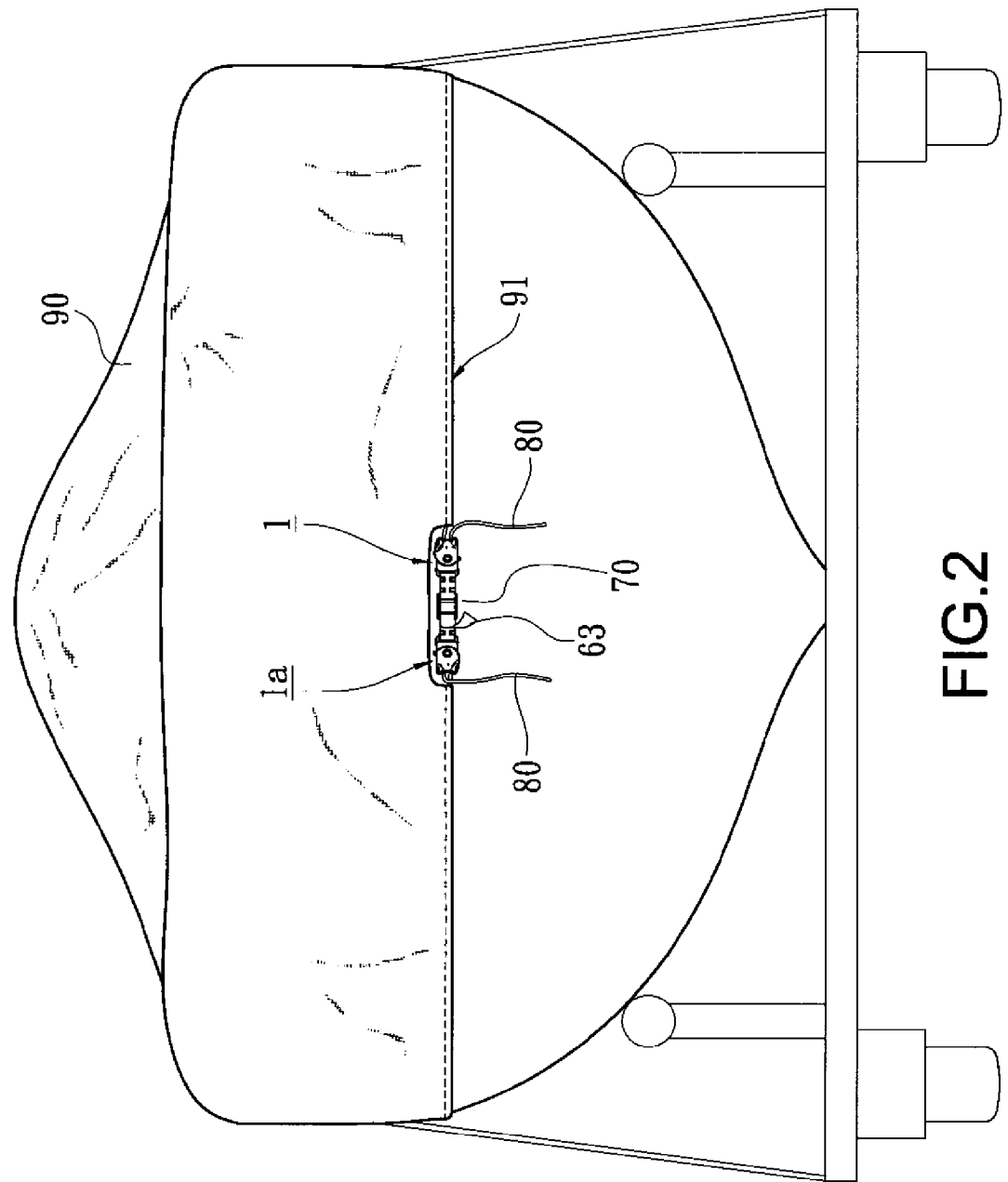
FIG. 2 is a schematic view illustrating the present invention loops up a covering sack.

Referring to FIGS. 1 and 2, a rope loop assembly in accordance with the present invention comprises two one-way locking devices 1, 1a, a length of pull rope 80, a length of a band 63, and a buckle 70. As shown, the band 63 has an end fixed to the buckle 70 and an opposite end extending through a slot 61 formed in a metal plate 60 of the first one-way locking device 1, further extending through a slot 61 formed in a metal plate 60 of the second locking device 1a, and eventually extending through a slot formed in front of a presser 76 of the buckle 70, whereby the band 63 is connected between the two one-way locking devices 1, 1a. The pull rope 80, which is connected to the locking devices 1, 1a, is looped around an opening rim 91 of a cover 90 (see FIG. 2) to effect fast looping-up and releasing.

Figure 7:
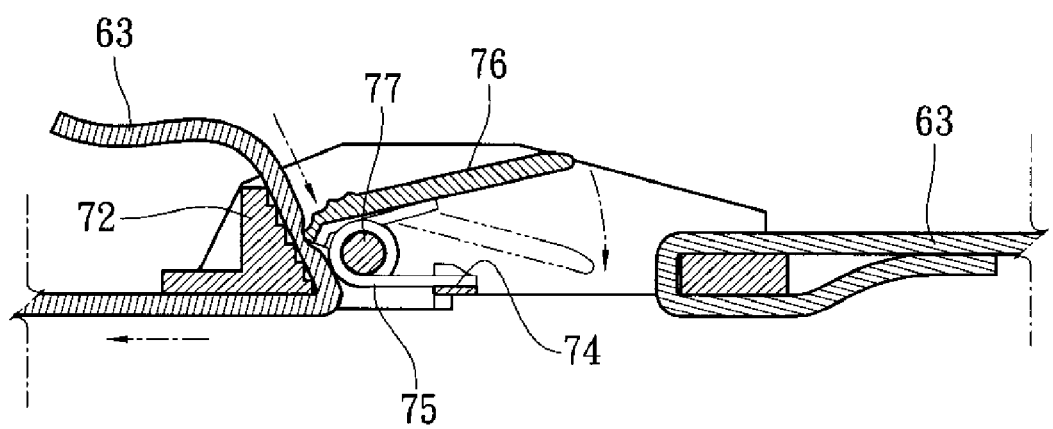
FIG. 7 is a cross-sectional view illustrating the band received in the buckle in accordance with the present invention.

To loop up the opening 91 of the cover 90, the end of the band 63 is inserted into the buckle 70 and the presser 76 is operated to effect engagement and securely fixing (see FIG. 7). Afterwards, an operator may use both hands to simultaneously pull the pull rope 80 from both one-way locking devices 1, 1a whereby the rope 80 fast reduces the diameter looped in a one-way ratcheted condition for looping up and the opening 91 is thus tightened to the extreme by the pull rope. Due to the two one-way locking devices 1, 1a that provide an effect against backward movement of the pull rope 80, the pull rope 80 is maintained in a gradually tightened condition during the looping up process and can be secured in the extremely tightened condition after the looping up of the rope.

Figure 6:
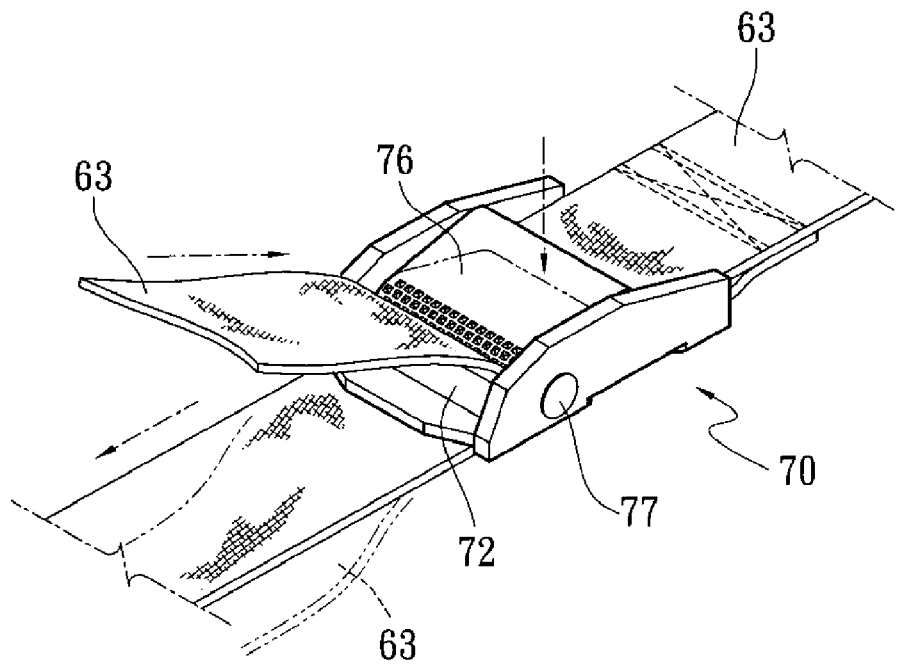
FIG. 6 is a perspective view illustrating a band inserting into a buckle in accordance with the present invention.

Referring to FIG. 6, to release the opening 91 of the cover for removing the cover, a release knob 53 that is provided in each one-way locking device 1, 1a can be operated to allow clockwise movement of the pull rope 80 for releasing. However, the pull rope 80 may get over-tightened, which causes the release knob 53 to be jammed by ratcheting teeth 33. In accordance with the present invention, a one-step operation of depressing the presser 76 of the buckle 70 can be done to release the band 63 for a given distance and by doing so, the release knobs 53 of the two one-way locking devices 1, 1a are released from jamming caused by over-tightening and can be operated to allow clockwise releasing movement of the pull rope 80 (see FIG. 9). Afterwards, the opening 91 of the cover that is looped up by the rope can be easily expanded to remove the cover 90. Fast looping up and releasing can be realized.

Figure 3:
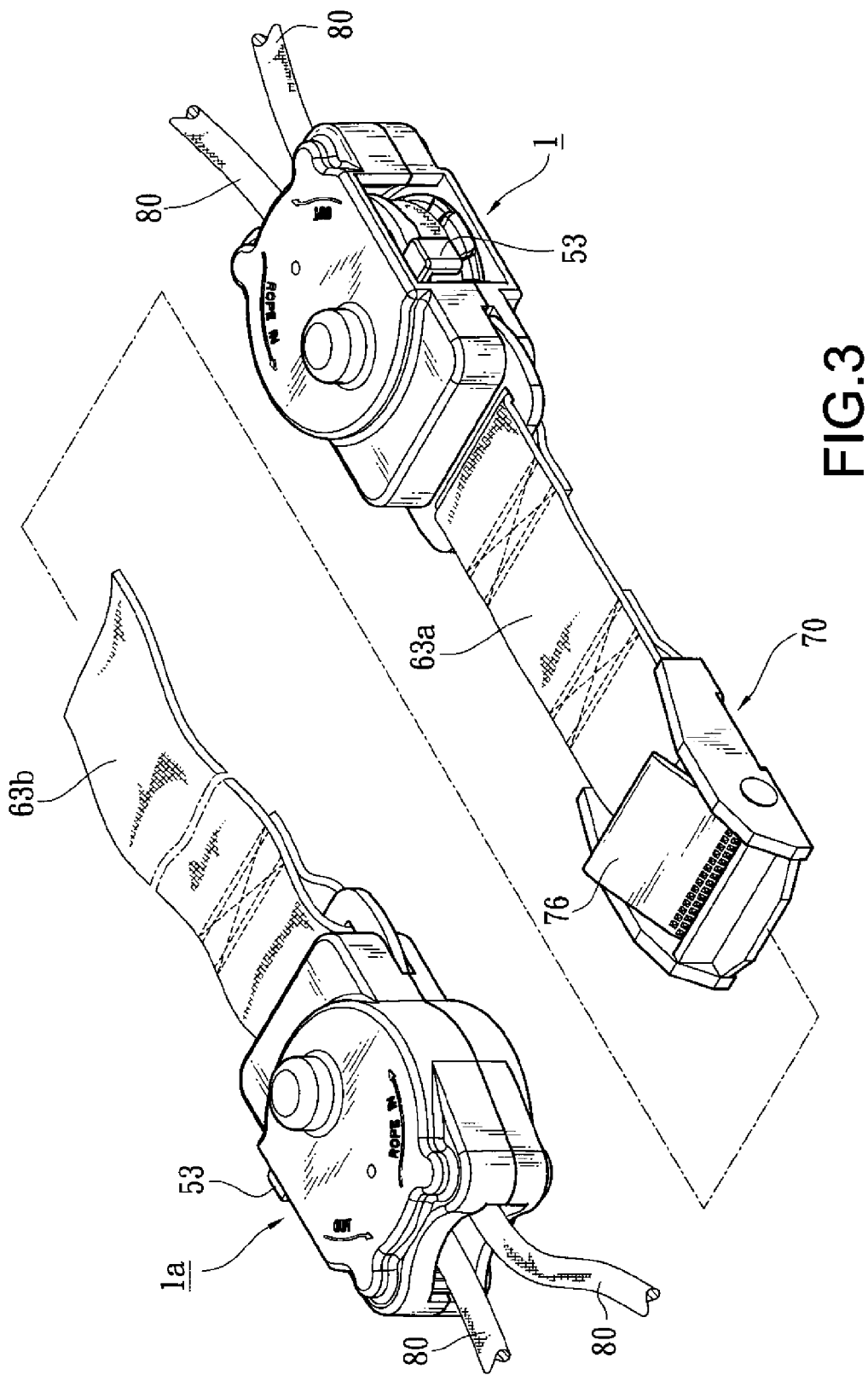
FIG. 3 is a perspective view of a second embodiment of the present invention.

Referring to FIG. 3, another embodiment of the present invention is illustrated, the rope loop assembly comprises a one-way locking device 1 to which a length of a band 63a is attached. An opposite end of the band 63a is attached to a buckle 70. Another one-way locking device 1a is fixed to an extended length of band 63b. The rope loop assembly further comprises a pull rope 80 that extends in and along an opening rim 91 of a cover 90 (see FIG. 2). To loop up, an end of the band 63b is inserted into the buckle 70 and engagement and fixing thereof is effected by the presser 76. A similar function of fast looping up and releasing can be realized.

Figure 4:
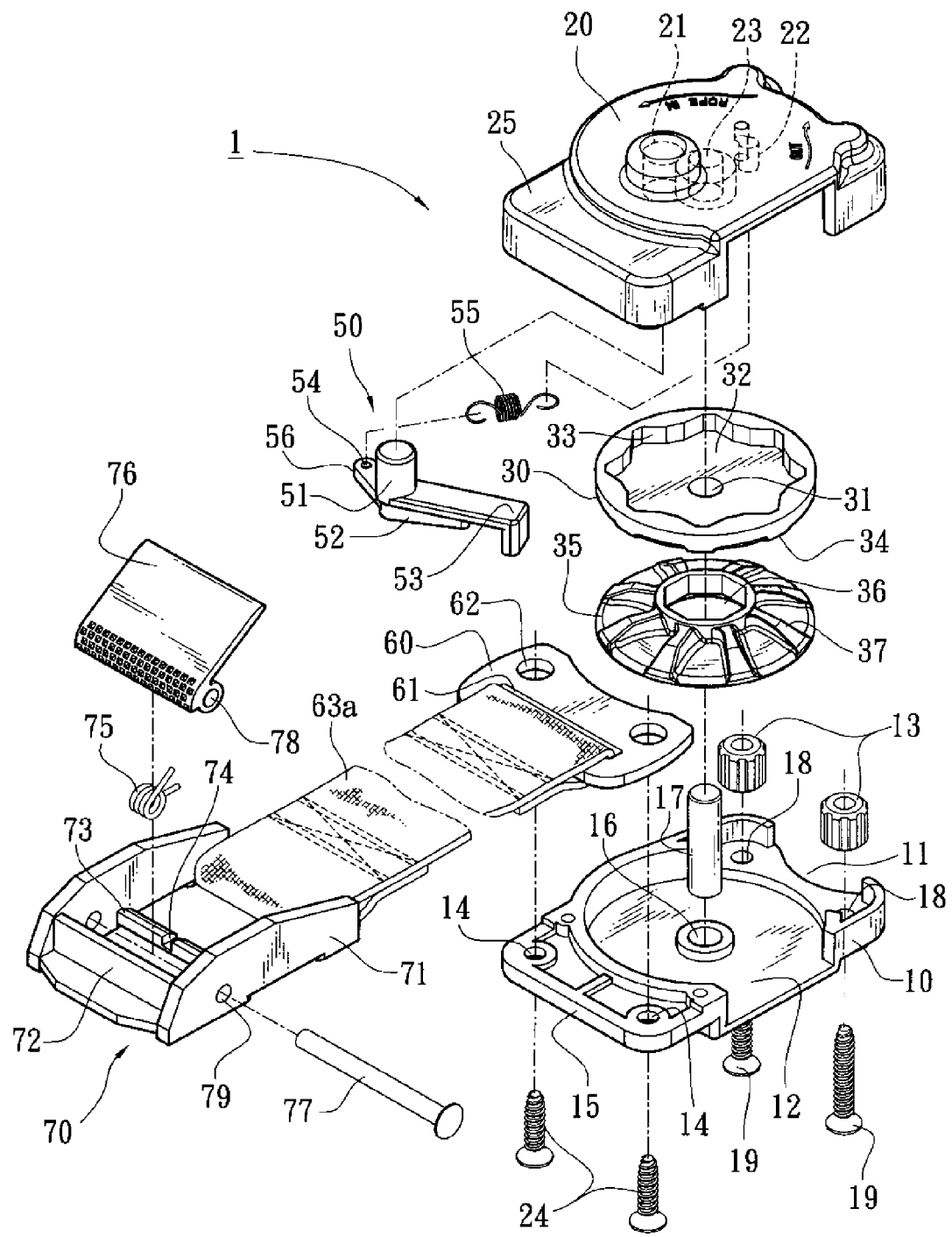
FIG. 4 is an exploded view of a one-way locking device of the present invention.
Figure 5:
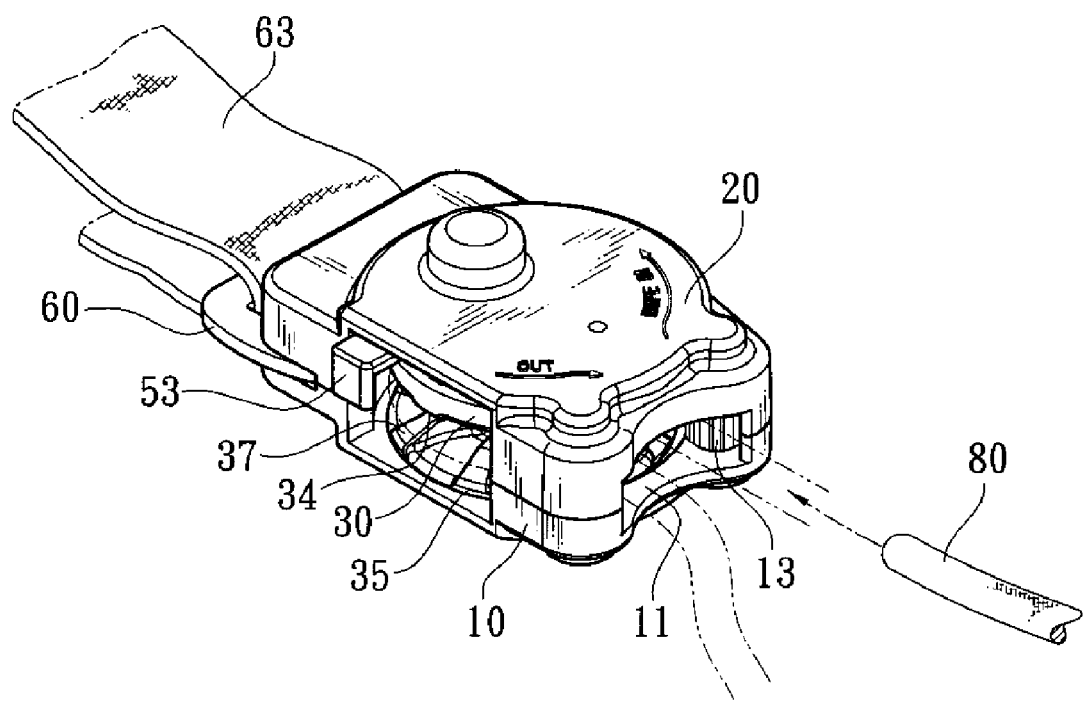
FIG. 5 is a perspective view illustrating a pull rope inserting into the one-way locking device in accordance with the present invention.

Referring to FIG. 4, the one-way locking device 1 (the one-way locking device 1a as well) is constructed in such a way that the one-way locking device 1 comprises a base 10, a cover 20, a rotary disk 30, a rotary wheel 35, and a locker 50. The base 10 forms at one side thereof a rope entry opening 11 opposite sides of which form holes 18. Two roller 13 are arranged above the holes 18 respectively and two bolts 19 extend in a down-to-up direction through the holes 18 and the rollers 13 to engage the cover 20 thereby rotatably holding the rollers 13 on the opposite sides of the opening 11 for protection of the pull rope 80 against abrasion and rubbing during the pulling operation of the rope. A recess 12 is centrally formed in the base 10 and a hole 16 is defined at a center of the recess 12. One side of the base 10 is extended to form an extension plate 15 that forms on left and right side portions thereof two holes 14. The cover 20 forms a positioning hole 21, a positioning post 22, and a slot 23, and is extended at one side thereof to form an extension plate 25. The rotary disk 30 forms a central bore 31. The rotary disk 30 has a top face, which forms a cavity 32 that has a circumference forming the ratcheting teeth 33. The rotary disk 30 has a bottom that has a configuration having a protruding central portion and a reduced circumferential portion and also forming raised ribs 34 that radially extend from a center defined by the bore 31 and an engagement peg (not shown) corresponding in shape to an engagement bore. The ribs 34 are arranged to respectively correspond to raised ribs 37 formed in the rotary wheel 35. The rotary wheel 35 comprises a body that has a center-protruding and circumference-reduced configuration and forms the engagement bore 36 (which is octagonal in the drawings) at a center thereof around which radially extending ribs 37 are set. In the embodiment illustrated, the engagement peg formed on the bottom face of the rotary disk 30 is fit into and engages the engagement bore 36 of the rotary wheel 35. However, the rotary disk 30 and the rotary wheel 35 can be integrally formed together, namely the engagement peg that is formed in the bottom of the rotary disk and is shaped corresponding to the engagement bore and the engagement bore defined in the center of the rotary wheel can be integrated together to provide an equivalent result.

Referring to FIGS. 3 and 4, the pull rope 80 is inserted into the rope entry opening 11 through the right hand side portion thereof, extending between the ribs of the rotary disk 30 and the rotary wheel 35 and then projecting outward through the left hand side portion of the rope entry opening 11. In this way of arrangement, the pull rope 80 can be withdrawn out of the locking device 1 by a counterclockwise movement or retracted back into the locking device 1 in a clockwise movement. The locker 50 comprises a bar 51 from which an operation arm 53 transversely extends. A tongue 56 also transversely extends from the bar 51 and is substantially opposite to the operation arm 53. The tongue 56 forms a through hole 54. A block 52 is formed on a bottom of the operation arm 53.

Referring to FIG. 4, the metal plate 60 that forms the slot 61 also forms holes 62. A high-tension band 63a is received through the slot 61. To assemble, bolts 24 are respectively and sequentially set through the holes 14 defined in the extension plate 15 of the base 10, the holes 62 defined in the metal plate 60 and then engage threaded holes defined in the extension plate 25 of the cover 20 so as to secure the metal plate 60 between the base 10 and the cover 20. An end of the band 63a extending through the slot 61 (see FIG. 3) is folded over and is fixed to the band 63a by sewing. An opposite end of the band 63a extends through the buckle 70 and is also folded over and sewn to the band 63a itself. Thus, the band 63a connects between the one-way locking device 1 and the buckle 70.

To assemble the one-way locking device 1, a central shaft 17 is first fit into the hole 61 defined in the recess 12 of the base 10. Alternatively, the central shaft is integrally formed with the hole. The engagement bore 36 of the rotary wheel 35 is then fit over the central shaft 17 to allow the rotary wheel 35 to be positioned in the recess 12 of the base 10. The rotary disk 30 is set to have the ribs 34 thereof opposing the rotary wheel 35 and the central bore 31 of the rotary disk 30 is fit over the central shaft 17 with the ribs 34, 37 of the rotary disk 30 and the rotary wheel 35 facing each other. The engagement peg formed on the bottom of the rotary disk and corresponding in shape to the engagement bore 36 is then fit into the engagement bore 36 of the rotary wheel 35. The bar 51 of the locker 50 is fit into the positioning hole 21 of the cover 20 and the block 52 of the locker 50 is received in the cavity 32 defined in the top face of the rotary disk 30. An end of a spring 55 is coupled to the through hole 54 of the tongue 56, while an opposite end of the spring 55 is attached to the positioning post 22 of the cover 20 to provide a returning biasing force to the block 52 when the block 52 is forced aside by the ratcheting teeth 33 during the rotation thereof.

Referring to FIG. 4, the band 63a extends between the metal plate 60 and the buckle 70. The buckle 70 comprises a chassis 71 of which one end is coupled to the band and an opposite end supporting a stop tab 72, a retention bar 73, a pivot 77, a spring 75, and the presser 76. The presser 76 forms a through hole 78. The pivot 77 sequentially extends through a hole 79 defined in one sidewall of the buckle 70, the through hole 78 of the presser 76, and the spring 75, and is fit into a hole defined in an opposite sidewall of the buckle 70 and fixed thereto by means of for example riveting, whereby the presser 76 is retained on the buckle 70. The spring 75 is rotatably and deformably arranged on the back side of the presser 76. The retention bar 73 forms a retention notch 74.

Figure 8:
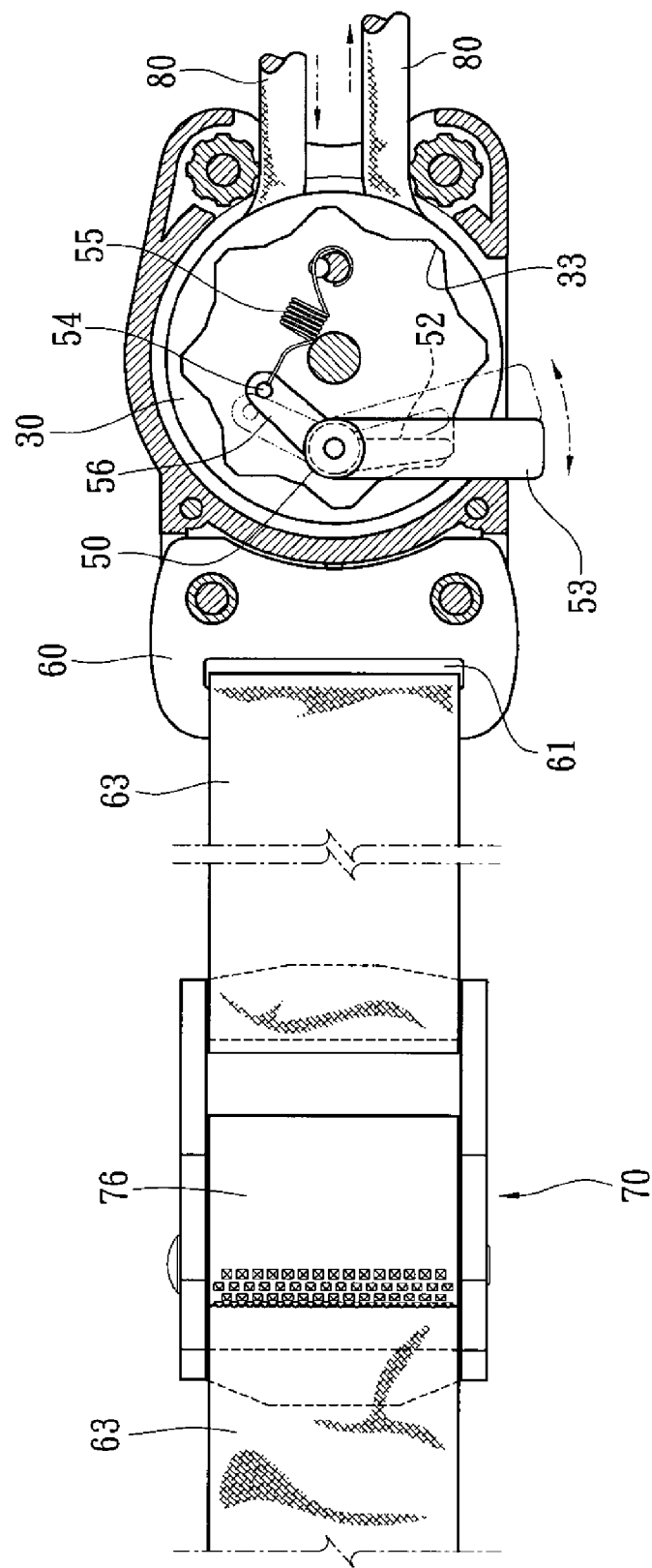
FIG. 8 is a plan view, partially broken, illustrating the operation of the one-way locking device in looping up, wherein a block is caused to resiliently leap between adjacent teeth by the movement of the pull rope.

Referring to FIG. 8, to insert the pull rope 80 in a counterclockwise direction into the one-way locking device 1 by inserting the pull rope 80 through one side portion of the rope entry opening 11, the pull rope 80 is caused to extend over outer surfaces of the ribs 34, 37 of the rotary disk 30 and the rotary wheel 35. The forward insertion of the pull rope 80 induces a dragging force to cause the rotary disk 30 and the rotary wheel 35 to rotate. The pull rope 80 projects outward through the opposite side portion of the rope entry opening 11 to complete the assembling of the one-way locking device. When the pull rope 80 is pulled by an external force, the pull rope 80 is only allowed to move in a single direction, namely a direction that causes counterclockwise rotation of the rotary disk 30 (and the rotary wheel 35). Under this condition, the block 52 of the locker 50 is resiliently leaping between adjacent teeth 33 under a biased condition with the spring 55 that is coupled to the through hole 54 of the tongue 56 of the block 52. Thus, each time the block 52 is put aside by one of the teeth 33, the spring 55 drives the tongue 56 back to the original position, and the pull rope can thus be smoothly pulled outward.

Figure 9:
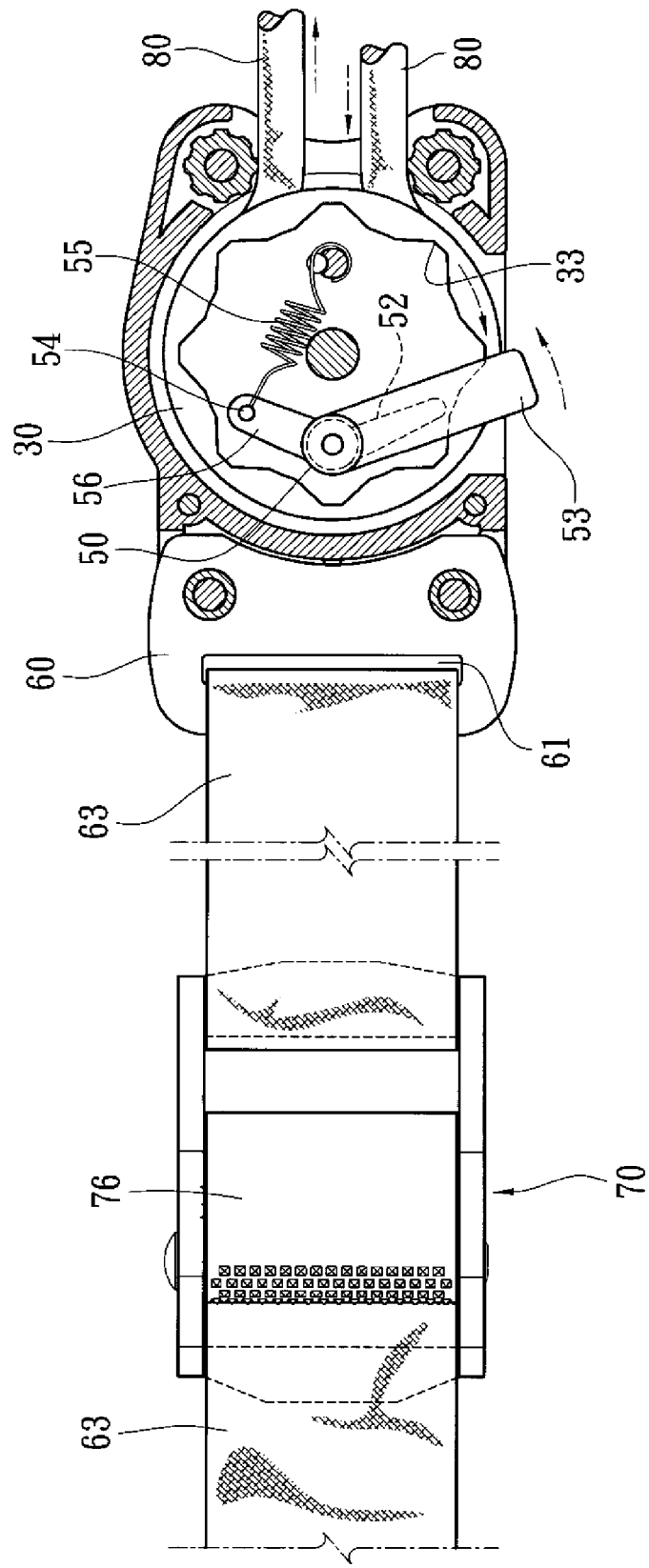
FIG. 9 is a plan view, partially broken, illustrating the operation of the one-way locking device in releasing the pull rope.

Referring to FIG. 9, on the other hand, when the pull rope 80 is pulled in a clockwise direction, the teeth 33 engages and blocks the block 52, preventing the rotary disk 30 from rotation. Thus, the pull rope 80 is constrained from moving outward. In this way, a one way locking function can be realized.

Referring to FIGS. 6, 7, and 9, due to the spring 75 arranged below the presser 76 of the buckle 70, the presser 76 is biased by the spring 75, which is held in the retention notch 74 to generate an upward spring force, to tightly engage and thus fix the band. The rope loop assembly in accordance with the present invention can be tightly looped up by continuously pulling the pull rope 80 that is allowed to do one-way movement. In case that an attempt to release the pull rope 80 when the pull rope 80 is in a tightened condition is made and the actuation of the operation arm 53 is jammed by the over-tight engagement between the block 52 and the teeth 53, slight relief of the pull rope tension is needed to remove the jamming. However, the over-tightened condition makes it difficult to release the rope. In accordance with the present invention, a one-stop operation of depressing the presser 76, which releases the band 63 coupled thereto for a distance, can effectively release the tension of the pull rope through the releasing of the band 63 through such a distance, making the rotary disk 30 no longer jammed and a buffering space for retraction of the pull rope 80 is provided. The block 52 can thus be disengaged from the teeth 53 by the operation of the operation arm 53. Consequently, fast clockwise retraction of the pull rope 80 can be carried out to release the rope loop assembly (see FIG. 9).

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fast looping-up and releasing rope loop assembly comprising two one-way locking devices, a pull rope, a band, and a buckle, wherein:

the two one-way locking devices lock the pull rope in such a way to each allow the pull rope to move in a single direction, the band has an end coupled to the buckle and an opposite end extending through a slot defined in a metal plate of the first one of the one-way locking devices and then through a slot defined in a metal plate of the second one of the one-way locking devices, the end of the band being further extending through a slot defined in the buckle in front of a presser whereby the band connects between the two one-way locking devices and the pull rope is adapted to loop up an opening of a covering sack; and wherein each of the one-way locking devices comprises a base, a cover, a rotary disk, a rotary wheel, and a locker, and wherein the base forms at one side thereof a rope entry opening and two holes on opposite sides of the rope entry opening, two bolts respectively extending in a down-to-up direction through the holes and engaging the cover to rotatably support rollers, a recess being centrally formed in the base with a central shaft mounted at a center of the recess;

the cover forming at one side thereof an entry opening, the cover also forming a recess in which a positioning hole, a positioning post, and a slot;

the rotary disk forming a central bore and having a top face, which forms a cavity that has a circumference forming ratcheting teeth and a bottom face that forms raised ribs and an engagement peg corresponding in shape to an engagement bore;

the rotary wheel forming the engagement bore and having a top face forming raised ribs;

the locker comprising a bar from which an operation arm extends, a tongue extending from the bar, the tongue being provided with a spring for resilient returning after being rotated, a block being formed on a bottom of the operation arm; and the buckle comprising a chassis of which one end is coupled to the band, the chassis being provided with a spring-biased presser.

2. The fast looping-up and releasing rope loop assembly according to claim 1, wherein the band comprises two separate sections, of which one is coupled to the buckle and the metal plate of one of the one-way locking devices and the other is coupled to the metal plate of the other one of the one-way locking devices.

3. The fast looping-up and releasing rope loop assembly according to claim 1, wherein the base of the one-way locking device forms at one side thereof an extension plate that forms on left and right side portions thereof two holes.

4. The fast looping-up and releasing rope loop assembly according to claim 1, wherein the cover of the one-way locking device forms at one side thereof an extension plate that forms on left and right side portions thereof two holes.

5. The fast looping-up and releasing rope loop assembly according to claim 1, wherein the rotary disk has a bottom that has a configuration having a protruding central portion and a reduced circumferential portion.

6. The fast looping-up and releasing rope loop assembly according to claim 1, wherein the rotary wheel has a body that has a configuration having a protruding central portion and a reduced circumferential portion.

7. The fast looping-up and releasing rope loop assembly according to claim 1, wherein the engagement bore of the rotary wheel of the one-way locking device is octagonal.

8. The fast looping-up and releasing rope loop assembly according to claim 1, wherein the engagement peg that is formed in the bottom of the rotary disk and corresponds in shape to the engagement bore and the engagement bore defined in the center of the rotary wheel are integrally formed together.

9. The fast looping-up and releasing rope loop assembly according to claim 1, wherein the tongue of the locker of one-way locking device forms a through hole and wherein a spring is connected between the through hole and the positioning post of the cover.

* * * * *